US012767905B2

(12) United States Patent
Zhang et al.

(10) Patent No.: US 12,767,905 B2
(45) Date of Patent: Oct. 20, 2026

(54) COMPOSITION FOR MAKING COMPRESSED CLEANING ARTICLES

(71) Applicant: 3M INNOVATIVE PROPERTIES COMPANY, St. Paul, MN (US)

(72) Inventors: Chunjie Zhang, Shoreview, MN (US); Yifan Zhang, Woodbury, MN (US); Douglas M. Williams, Stillwater, MN (US); Siwei Leng, Woodbury, MN (US); Sedat Gunes, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 285 days.

(21) Appl. No.: 18/574,218

(22) PCT Filed: Jun. 29, 2022

(86) PCT No.: PCT/IB2022/056079

§ 371 (c)(1),
(2) Date: Dec. 26, 2023

(87) PCT Pub. No.: WO2023/275802

PCT Pub. Date: Jan. 5, 2023

(65) Prior Publication Data

US 2024/0318098 A1 Sep. 26, 2024

Related U.S. Application Data

(60) Provisional application No. 63/216,710, filed on Jun. 30, 2021.

(51) Int. Cl.

| | |
|---|---|
| ***C11D 1/00*** | (2006.01) |
| ***C02F 5/00*** | (2023.01) |
| ***C11D 3/00*** | (2006.01) |
| ***C11D 3/12*** | (2006.01) |
| ***C11D 3/20*** | (2006.01) |
| ***C11D 17/00*** | (2006.01) |

(52) U.S. Cl.

CPC .......... *C11D 3/0052* (2013.01); *C11D 3/0047* (2013.01); *C11D 3/1246* (2013.01); *C11D 3/2086* (2013.01); *C11D 17/0073* (2013.01)

(58) Field of Classification Search

CPC ........... C11D 1/00; C11D 3/00; C11D 3/0047; C11D 3/0052; C11D 3/12; C11D 3/122; C11D 3/1293; C11D 3/2086; C11D 17/0056; C11D 17/0073; C02F 5/00

See application file for complete search history.

(56) References Cited

U.S. PATENT DOCUMENTS

| | | | |
|---|---|---|---|
| 4,459,217 A | 7/1984 | Bogie | |
| 4,664,836 A | 5/1987 | Taylor, Jr. et al. | |
| 6,149,821 A | 11/2000 | Rounds et al. | |
| 6,486,117 B1 | 11/2002 | Painter | |
| 8,877,240 B1 | 11/2014 | Moore | |
| 9,469,828 B2 | 10/2016 | Moore | |
| 2002/0061831 A1 | 5/2002 | Kaziska | |
| 2020/0190446 A1* | 6/2020 | Sivik | B08B 3/003 |
| 2021/0171881 A1* | 6/2021 | Colclasure | C11D 3/0052 |

FOREIGN PATENT DOCUMENTS

| | | | |
|---|---|---|---|
| JP | 2018016676 | A | 2/2018 |
| WO | 9906522 | W | 2/1999 |
| WO | 1999024548 | A1 | 5/1999 |
| WO | 2001049818 | A1 | 7/2001 |
| WO | 2003089560 | A2 | 10/2003 |
| WO | 2005061689 | | 7/2005 |
| WO | 2020123888 | A1 | 6/2020 |
| WO | 2021240407 | A1 | 12/2021 |

OTHER PUBLICATIONS

International Search Report for PCT Application No. PCT/IB2022/056079, mailed on Sep. 16, 2022, 5 pages.

Office Action dated Nov. 26, 2025 in co-pending Taiwan Application No. 111124550.

* cited by examiner

*Primary Examiner* — Brian P Mruk
*Assistant Examiner* — Shreya Paul
(74) *Attorney, Agent, or Firm* — Ann K. Gallagher

(57) ABSTRACT

The present invention is a cleaning composition including a binder, a gas generator, an acid, and at least about 0.1% water. The cleaning article has an aged Shore A hardness of at least about 10, an aged Shore D hardness of up to about 100, and a dissolution time of between about 1 minute and about 60 minutes.

17 Claims, No Drawings

COMPOSITION FOR MAKING COMPRESSED CLEANING ARTICLES

FIELD OF THE INVENTION

The present invention relates generally to the field of cleaning compositions. In particular, the present invention is a cleaning composition for toilets.

BACKGROUND

Cleaning toilets is an undesirable but necessary task. Current methods of cleaning toilets commonly involve applying a cleaning agent within a toilet bowl and then scrubbing the toilet bowl with a handheld tool. The handheld tool generally includes bristles or a cleaning head that can be used to scour the inner surface of the toilet bowl, removing debris and stains. Due to the need to manually scrub the toilet bowl, the person cleaning the toilet must be in close proximity to the toilet, a condition which most people find unappealing.

In an attempt to create more distance from the toilet while cleaning it, various products have been developed that can be dropped into a toilet bowl to clean the debris and stains without the need for manually scrubbing the toilet bowl. However, most of these products include bleach or other harsh chemicals with their unpleasant, harsh odor and problematic environmental profile, to kill microbial soils. Other products do not include bleach, but do not clean the toilet bowl as thoroughly.

SUMMARY

In one embodiment, the present invention is a cleaning composition including a binder, a gas generator, an acid, and at least about 0.1% water. The cleaning article has an aged Shore A hardness of at least about 10, an aged Shore D hardness of up to about 100, and a dissolution time of between about 1 minute and about 60 minutes.

In another embodiment, the present invention is a solid cleaning composition including an inorganic binder that reacts with water to harden, a gas generator, an acid, and a water-containing liquid.

DETAILED DESCRIPTION

The present invention is a composition that can be used for making compressed cleaning articles. The composition provides effervescence, foaming, and acidity after being dissolved in water. In addition, the composition can be compressed into a solid article at low temperatures. This composition has good stability at both room temperature and elevated temperatures. In one embodiment, the composition can be used along with other materials such as surfactants, fragrance, abrasives, minerals, and colorants to allow the creation of a wide spectrum of cleaning articles. In addition, the composition of the present invention is environmentally friendly, being benign to humans and the environment. The composition is fully dissolvable in water and leaves minimal residue after cleaning. The key characteristics of this composition can be tuned to specifically allow enhanced oxidizing power, acidity or effervescence as needed by product development needs. The composition can be molded under pressure at room temperature into a cleaning article. The cleaning article can gradually dissolve in the presence of water, providing effervescence, foaming, acidity, and abrasives properties to enable effective cleaning. In one embodiment, the composition is used to clean and/or remove stains such as hard water stains from toilet bowls.

The composition generally includes a binder, a gas generator, an acid, and a water-containing liquid. In one embodiment, the composition includes between about 1 and about 50 wt % binder, between about 10 and about 50 wt % gas generator, between about 15 and about 70 wt % acid, and between about 0.1 and about 20 wt % water-containing liquid. Particularly, the solid-state composition includes between about 5 and about 30 wt % binder, between about 20 and about 30 wt % gas generator, between about 15 and about 45 wt % acid, and between about 1 and about 5 wt % water-containing liquid.

The binder functions to maintain the components of the composition together. The binder must be strong enough to hold the mechanical integrity and provide hardness to the composition until the composition comes into contact with water, at which time it can dissolve. The binder can chemically or physically hold together the components of the composition, forming covalent bonds, ionic bonds, hydrogen bonds, Van der Waals interactions, or other secondary interactions, in the presence of the water-containing liquid. The binder can be inorganic or organic, or a combination of both. The binder can be chemically reactive or unreactive during the binding process.

In one embodiment, the binder is an inorganic binder that reacts with water to cause the composition to harden. To harden means that the binder reacts with water to form a new hydrated form or the binder condenses and crosslinks in the presence of water. The hardened binder provides structural support to the composition and makes it resistant to deterioration caused by water. During the hardening process, the binder can form hydrogen bonding with other components, improving the structural integrity of the composition. Compared to an unreactive binder, the use of an inorganic binder that is reactive with water can significantly improve the hardness and mechanical integrity of the composition after the composition is compressed at room temperature under the same amount of force. After forming a compressed article, the composition containing the reactive inorganic binder can maintain enough hardness, mechanical integrity, and durability for scrubbing and cleaning with minimal swelling of the formed geometry, for example, when in contact with water inside a toilet bowl. It is the strong bonding ability of the reactive inorganic binder that enables the durability of the compressed article when used in water or in a wet environment. The durability of the compressed article in a wet state can be quantified by the number of cycles that the compressed article can move back and forth linearly with a selected path length (5 cm, 10 cm, 20 cm) and speed, or selected number of cycles on a circular path and speed, under certain applied weight (0.5 kg, 1.0 kg, 2.0 kg, 5 kg, 10 kg) in wet state, on a suitable machine, for example, a Taber Linear Abraser or Taber Rotary Platform Abrasion Tester (North Tonawanda, NY). The wet state means the compressed article is immersed in water, and then taken out, or stays immersed in water, during testing. To simulate the use of the compressed article in water or in a wet environment, the compressed article with a cylindrical geometry (diameter of 4 cm, height of 0.25 cm, 0.38 cm, 0.50 cm or 0.56 cm) is first immersed in water to allow complete penetration of water into the compressed article, pressed against a hard surface, then moved back and forth with a path length of about 20 cm held by hand. The compressed article is considered to show sufficient "wet hardness", that is, sufficient, mechanical integrity, and durability when used in wet state. The compressed article effervesces and foams when rubbed against the hard surface with force applied by hand and gradually loses mass during the simulated cleaning process.

Compressed articles containing unreactive binders will lose their hardness and mechanical integrity or swell when used in water within a short period of time, for example, about 2 minutes. The hardness of the composition can be measured, for example, by compressing a durometer for Shore Hardness A or D on the surface of the composition following procedures described in ASTM D 2240-00. Aged hardness is the hardness measured on a compressed composition aged at room temperature in air for two weeks. Examples of a particularly suitable reactive inorganic binders include, but are not limited to: calcium sulfate hemihydrate, anhydrous calcium sulfate, sodium silicate, sodium metasilicate, potassium silicate, potassium metasilicate, lithium metasilicate, lithium silicate, cement, and combinations thereof. An example of a particularly suitable reactive inorganic binder includes, but is not limited to, formulated binder compositions based on calcium sulfate hemihydrate, such as DURABOND 20, DURABOND 45, and DURABOND 90 available from USG, located in Chicago, IL.

Examples of particularly suitable organic binders include, but are not limited to: sugars (such as glucose, fructose, galactose, sucrose, lactose, maltose, and liquid glucose), organic acid salts (such as sodium acetate, calcium acetate, sodium propanoate, sodium glycolate, and sodium citrate), polymers (such as hydroxypropyl cellulose, methyl cellulose, ethyl cellulose, hydroxy propyl methyl cellulose, sodium carboxy methyl cellulose, gelatin, gum arabic chitosan, alginic acid, starch, polyvinylpyrrolidone, polyvinyl alcohol, polyethylene glycol, acrylate polymers, polyurethane, styrene-butadiene rubber, polyester, polyamide, polyethylenimine, vinyl polymer), and combinations thereof.

The water or water-containing liquid functions as a reactant with the binder, serves as a medium for other components in the composition to react, as well as serves as the carrier of additives. The reactive inorganic binder can react with water in the water-containing liquid to harden and provide hardness and mechanical integrity to the composition. The water in the water-containing liquid can also serve as the medium for the acid and gas generator to react and generate more water, which creates hydrogen bonding in the composition to improve hardness and mechanical integrity. The water-containing liquid has a water content sufficient to react with the binder. In one embodiment, the water-containing liquid has a water content of at least about 0.1% and particularly at least about 1 wt %. Examples of suitable water-containing liquids include, but are not limited to: water, aqueous solution of inorganic compounds, aqueous solution of polymers, aqueous dispersion of polymers, aqueous dispersion of organic molecules, liquid organic compounds, mixtures of liquid water and organic compounds, aqueous solutions of organic compounds, and combinations thereof. Examples of suitable liquids include, but not limited to: deionized water, aqueous solution of calcium chloride, aqueous solution of calcium acetate, aqueous solution of sodium acetate, aqueous solution of polyacrylic acid and its sodium salt, aqueous solution of polyvinyl alcohol, aqueous solution of polyvinylpyrrolidone, aqueous solution of polyethylene glycol, aqueous solution of polyethylenimine, aqueous solution of polystyrene sulfonate, aqueous solution of polyester, aqueous dispersion of polyurethane, aqueous dispersion of polyvinyl acetate, aqueous dispersion of styrene butadiene rubber, aqueous dispersion of polyacrylate, aqueous dispersion of polyamide, aqueous dispersion of polyolefin, aqueous dispersion of rosin and its derivatives, mixture of water and acetic acid, mixture of water and lactic acid, aqueous solution of glycolic acid, and aqueous solution of gluconic acid, aqueous dispersion of fragrance, aqueous dispersion of pigment, aqueous solution of dye, and combinations thereof.

The gas generator functions as an effervescent agent to create foam/bubbles. By producing foam and/or bubbles, the composition is capable of reaching additional surface area. Examples of suitable gas generators include, but are not limited to: carbon dioxide generators and oxygen generators. Examples of suitable carbon dioxide generators include, but are not limited to: bicarbonate salts of Group I metals, of Group II metals and of other cations, including ammonium, alkyl (mono-, di-, or tri-) ammonium, or those of transition metals: carbonate salts of Group I metals, of Group II metals, and of other cations, including ammonium, alkyl (mono-, di-, or tri-) ammonium, or those of transition metals; and percarbonate salts of Group I metals, of Group II metals, and of other cations, including ammonium, alkyl (mono-, di-, or tri-) ammonium, or those of transition metals. Examples of particularly suitable carbon dioxide generators include, but are not limited to: sodium carbonate, sodium bicarbonate, potassium carbonate, potassium bicarbonate, and calcium bicarbonate.

Examples of suitable oxygen generators include, but are not limited to: hydrogen peroxide: peracetic acid generated from sodium percarbonate/TAED (tetraacetylethylenediamine): percarbonate salts of Group I metals, of Group II metals and of other cations, including ammonium, alkyl (mono-, di-, or tri-) ammonium, or those of transition metals; chlorate and perchlorate salts of Group I metals, of Group II metals and of other cations, including ammonium, alkyl (mono-, di-, or tri-) ammonium, or those of transition metals: superoxide salts of Group I metals, of Group II metals and of other cations, including ammonium, alkyl (mono-, di-, or tri-) ammonium, or those of transition metals; and peroxide salts of Group I metals, of Group II metals and of other cations, including ammonium, alkyl (mono-, di-, or tri-) ammonium, or those of transition metals.

The acid functions as both an effervescent agent and a cleaning agent. The acid can be any solid form organic or inorganic acid. Examples of suitable acids include, but are not limited to: sodium bisulfate, sulfamic acid, glycolic acid, maleic acid, benzoic acid, and succinic acid.

Other additives can be included in the composition to perform various functions. Examples include, but are not limited to: chelating agents, surfactants, oxidizers, biocides, antimicrobial agents, anti-caking agents, hydrophilic agents, dispersants, co-binders, fillers/tougheners, softeners, abrasive particles, desiccants, mold release agents, lubricants, disintegrants, cleaning agents, coupling agents, photoinitiators, thermal initiators, viscosity modifiers, adhesion promoters, grinding aids, wetting agents, dispersing agents, light stabilizers, antioxidants, anti-foam agents, coloring agents, dyes, pigments, and fragrances. Particularly suitable additives include components which aid in improving the stability of the composition before compression and formation for a compressed article. Examples include anti-caking agents, dispersants, and co-binders. Particularly suitable additives to aid the releasing of the compressed article include, but are not limited to: mold release agents and lubricants.

When a chelating agent is included in the composition, the chelating agent primarily functions as complex forming agents with metal ions dissolved in water or metal ions precipitated on toilet surface as stains. It also promotes cleaning as well as foaming. Examples of suitable chelating agents include, but are not limited to: citric acid and its sodium salts, ethylenediaminetetraacetic acid (EDTA) and its sodium salts, ethylene glycol tetraacetic acid (EGTA) and its sodium salts, and maleic acid and its sodium salts.

When a surfactant is included in the composition, the surfactant is used as a cleaning and foaming agent. Examples of suitable surfactants include, but are not limited to: anionic surfactants, nonionic surfactants, cationic surfactants, zwitteronic surfactants, amphoteric surfactants, oligomeric and polymeric surfactants. Examples of suitable anionic surfactants include, but are not limited to: alkyl and alkyl ether sulfates, sulfated monoglycerides, sulfonated olefins, alkyl aryl sulfonates, primary or secondary alkane sulfonates, alkyl sulfosuccinates, acid taurates, alkyl sulfoacetates, acid isethionates, alkyl glycerylether sulfonate, sulfonated methyl esters, sulfonated fatty acids, alkyl phosphates, acyl glutamates, acyl sarcosinates, alkyl lactylates, anionic fluorosurfactants, sodium lauroyl glutamate, and combinations thereof. Additional suitable anionic surfactants include those disclosed in U.S. Patent Application No. 61/120,765 and those surfactants disclosed in McCutcheon's Detergents and Emulsifiers, North American Edition (1992), Allured Publishing Corp. Examples of suitable nonionic surfactants include, but are not limited to: polyoxyethylenated alkyl phenols, polyoxyethylenated alcohols, polyoxyethylenated polyoxypropylene glycols, glyceryl esters of alkanoic acids, polyglyceryl esters of alkanoic acids, propylene glycol esters of alkanoic acids, sorbitol esters of alkanoic acids, polyoxyethylenated sorbitor esters of alkanoic acids, polyoxyethylene glycol esters of alkanoic acids, polyoxyethylenated alkanoic acids, alkanolamides, N-alkylpyrrolidones, alkyl glycosides, alkyl polyglucosides, alkylamine oxides, and polyoxyethylenated silicones. Examples of suitable cationic surfactants include, but are not limited to, those selected from the "quaternary ammonium" class of materials including but not limited to: cetyltrimethylammonium chloride, behenyltrimethylammonium chloride, stearyltrimethylammonium chloride, cetylpyridinium chloride, octadecyltrimethylammonium chloride, hexadecyltrimethylammonium chloride, octyldimethylbenzylammonium chloride, decyldimethylbenzylammonium chloride, stearyldimethylbenzylammonium chloride, didodecyldimethylammonium chloride, dioctadecyldimethylammonium chloride, distearyldimethylammonium chloride, tallowtrimethylammonium chloride, cocotrimethylammonium chloride, dipalmitoylethyldimethylammonium chloride, PEG-2 oleylammonium chloride, and salts of these, where the chloride is replaced by halogen, (e.g., bromide), acetate, citrate, lactate, glycolate, phosphate nitrate, sulphate, or alkylsulphate. Examples of suitable zwitteronic and amphoteric surfactants include, but are not limited to: amine oxides, betaines (carboxylic acid/quaternary ammonium or carboxylic acid/phosphonium), sulfobetaines, or carboxybetaines, sultaines (sulfonic acid/quaternary ammonium or sulfonic acid/phosphonium), amino acid derivatives, imidizoline derivatives, lecithins, and phospholipids. Examples of suitable polymeric surfactants include, but are not limited to: block copolymers of ethylene oxide and fatty alkyl residues, block copolymers of ethylene oxide and propylene oxide, hydrophobically modified polyacrylates, hydrophobically modified celluloses, silicone polyethers, silicone copolyol esters, diquaternary polydimethylsiloxanes, and co-modified amino/polyether silicones.

When the composition includes an oxidizer, the oxidizer functions to oxidize organic stains and to remove bacteria. Examples of suitable oxidizers include, but are not limited to: sodium persulfate, potassium persulfate, ammonium persulfate, sodium percarbonate, carbamide peroxide, complex of polyvinylpyrrolidone with hydrogen peroxide, sodium perborate, peracetic acid, and combinations thereof. An example of a suitable commercially available oxidizer includes, but is not limited to, Oxone, available from Dupont, located in Wilmington, DE. In one embodiment, when the solid-state composition includes oxidizer, the solid-state composition includes up to about 15 wt % oxidizer, and particularly up to about 5 wt % oxidizer.

The composition may optionally include a biocide to remove bacteria. Examples of suitable biocides include, but are not limited to: benzalkonium chloride, sodium dichloroisocyanurate, benzisothiazolinone chlorhexidine chlorhexidine, quaternary ammonium derivatives, and combinations thereof. In one embodiment, when the composition includes a biocide, the solid-state composition includes up to about 5 wt % biocide, and particularly up to about 2 wt % biocide.

The composition has an acidic pH, making it favorable to cleaning surfaces, such as a toilet bowl, which are etched by protons in aqueous solution. In addition, hard water stains and lime scales can be dissolved under acidic conditions. A basic pH is favorable to forming hard water stains and deposits of organic matters on toilet bowl. Thus, it is desirable for the composition to have an acidic pH. In one embodiment, the composition has a pH of between about 0 and about 6, particularly between about 1 and about 5, and particularly between about 2 and about 5 when dissolved in water.

Due in part to its low pH, the composition can effectively remove various debris and stains, such as hard water stains and lime scale. In practice, the composition must come into contact with a sufficient amount of water or a mixture of water and polar solvents to begin the reactions needed to clean the intended surface. Once the composition is exposed to water, the composition will begin to dissolve and foam. Water serves as a media for reactions to take place. The acid and gas generator react to release carbon dioxide which rises to the surface through aqueous solution of surfactants, creating bubbles in solution and forming a foam layer on surface. The foaming allows the composition to contact hard to reach surfaces, such as the underside of the inner surface of a toilet bowl. In one embodiment, a sufficient amount of foam is produced to have a foam height of at least about 0.1 cm, at least about 0.5 cm, at least about 0.75 cm, at least about 1 cm, at least about 1.25 cm, at least about 1.5 cm, at least about 1.75 cm, at least about 2 cm, and at least about 3 cm.

The composition has two key characteristics: cleaning efficacy and the ability to be molded into various geometries under room temperature. The cleaning efficacy includes effervescence, foaming, acidity, and abrasive properties to remove hard water stain, limescale and organic stains from the surface to be cleaned. In one embodiment, the composition can be added into water wherein the cleaning efficacy is static without the use of mechanical force. In one embodiment, the composition can be used as a scrubber on a surface wherein the cleaning efficacy is a convolution of static cleaning efficacy and scrubbing by mechanical force. Additional features of the composition including fragrance, color, oxidizing power, and antimicrobial properties that can be incorporated into the basic formula of the composition to allow the creation of a wide spectrum of cleaning products. In one embodiment, the composition can remove at least about 25%, at least about 50%, at least about 60%, at least about 70%, at least about 80%, at least about 90%, at least about 95% of hard water stains. In one embodiment, the solid-state composition can remove at least about 25%, at least about 50%, at least about 60%, at least about 70%, at least about 80%, at least about 90%, at least about 95% of lime scale.

After being molded into a condensed, solid-state format, the composition provides adequate mechanical integrity, hardness, toughness, and durability to be used on a hard surface. In one embodiment, the solid-state composition is in the form of a tablet or pod that can be dropped into, for example, a toilet bowl, to provide cleaning. In one embodiment, the composition can be molded into a cleaning head and used in conjunction with a handheld tool. This provides a dissolvable head that functions as a scrubbing tool as well as providing the needed chemicals for cleaning. The solid-state composition thus has dual functionality of being used as a tablet and/or used on a handle. The solid-state composition can also first be used on a handle for cleaning with mechanical force and then released into water for static cleaning.

The composition must have a certain hardness and durability such that it does not immediately dissolve or break apart when it is contacted with water and must remain in a solid-state form for an amount of time sufficient to contact and clean a surface. In one embodiment, the composition has an aged Shore A hardness of at least about 30, particularly at least about 30, more particularly at least about 50 and about 100, and even more particularly at least about 80. In one embodiment, the solid-state composition has an aged Shore D hardness of between about 10 and about 100, and particularly between about 20 and about 70. The amount of time the composition remains in a solid-state form can be measured as dissolution time, defined as the time that a 5 gram solid-state composition takes to disintegrate and dissolve when immersed in 195 grams of water without agitation after the 5 gram solid-state composition has been aged in the air at ambient conditions for 2 weeks. The solid-state composition has a dissolution time that is optimal for scrubbing the surface to be cleaned. In one embodiment, the solid-state composition has a dissolution time of between about 1 minute and about 60 minutes, particularly between about 5 and about 40 minutes, and particularly between about 10 and about 30 minutes.

To make the solid-state composition of the present invention, the components are mixed together. If there is a fragrance, the composition must include an anti-caking agent. In one embodiment, the anti-caking agent is hydrophobic. Examples of suitable anti-caking agents include, but are not limited to: fumed silica, fumed alumina, clay, and corn starch. The anti-caking agent and fragrance are first mixed, and then mixed with any surfactants to form a pre-mixture, after which the pre-mixture is mixed with the mixture of remaining components. The final mixture of the composition is added into a cavity or mold where mechanical force is applied to compress the mixture into a compressed article. The compressed article can take on any geometry without departing from the intended scope of the present invention. After released from the cavity or mold, the compressed article is aged in the air or in a sealed environment at ambient conditions to allow it to harden over time. In one embodiment, the resulting solid-state composition is compressed to form a tablet. In one embodiment, the solid-state composition is wrapped by a water-soluble polymer film to form a pod.

Examples

Unless otherwise noted or readily apparent from the context, all parts, percentages, ratios, etc. in the Examples and the rest of the specification are by weight.

Materials

| Description/ Abbreviation | Description and Source |
|---|---|
| Sodium persulfate ($Na_2S_2O_8$) | Obtained from PeroxyChem, Philadelphia, PA |
| Sodium bisulfate ($NaHSO_4$) | Obtained from Jones-Hamilton Co., Walbridge, OH |
| Sodium carbonate ($Na_2CO_3$) | Obtained from Genesis Alkali, Philadelphia, PA |
| Citric acid | Granular Grade, obtained from Cargill, Wayzata, MN |
| LATHONAL LAL | Anionic surfactant providing foaming, wetting and emulsification, obtained from Stepan Company, Northfield, IL |
| STEPANOL WA-100 NF/USP | Anionic surfactant used in dentifrices, hand cleaners, bubble baths, liquid hand soaps and shampoo formulations, obtained from Stepan Company, Northfield, IL |
| SIPERNAT 50S | Silica with high absorption capacity, obtained from Evonik Corporation, Parsippany, NJ |
| SHEETROCK DURABOND 45 | Joint compound for drywall finishing (primarily composed of calcium sulfate hemihydrate (>60%) and minerals), Manufactured by USG Corporation and obtained from Home Depot, St. Paul, MN |
| Calcium Sulfate Hemihydrate ($CaSO_4$•$H_2O$) | ≥97.0%, obtained from Sigma Aldrich, St. Louis, MO |
| Calcium Sulfate Dihydrate (CaSO4•2H2O) | ACS reagent, 98%, obtained from Sigma Aldrich, St. Louis, MO |
| Calcium Carbonate (CaCO3) | ACS reagent, ≥99.0%, powder, obtained from Sigma Aldrich, St. Louis, MO |
| Pumice | Amorphous aluminum silicate, obtained from CB Minerals LLC, Mamaroneck, NY |
| POLYOX WSR 205 | Polyethylene oxide powder, MW is 600,000, obtained from Dupont, Wilmington, DE |
| Poly(acrylic acid) | Average Mv ~1,250,000, obtained from Sigma Aldrich, St. Louis, MO |
| SOKALAN CP10 | Modified polyacrylic acid sodium salt, 45% solids aqueous solution, Mw is ~3500, obtained from BASF Corporation, Florham Park, NJ |
| SOKALAN CP10S | Modified polyacrylic acid, 50% solids aqueous solution, Mw is ~4000, obtained from BASF Corporation, Florham Park, NJ |
| SZ 41894 Citrus | Fragrance, obtained from Sozio Inc., Piscataway, NJ |
| Duasyn Ink Blue SLK | Obtained from Clariant AG, Muttenz, Switzerland |

Test Methods

Tablet Hardness—Shore Hardness

Shore Hardness is a measure of the resistance a material has to indentation. Higher values indicate a greater resistance to indentation and thus harder materials. Lower numbers indicate less resistance and softer materials. Handheld durometers were used to measure the Type A and Type D Shore Hardness (Model 3000 by Rex Gauge, Buffalo Grove, IL) of the Example tablets, according to ASTM D2240-00 test protocol. Unless stated differently below, the Example tablets tested were approximately 4 cm in diameter and 0.63 cm thick, with a density of about 1.5 g/cm$^3$. Unless stated differently below, the values in the Tables are an average of at least three measurements taken on a single tablet.

Tablet Properties—Dissolution Time, pH, Effervescence, Residuals:

Prior to testing, the tablets to be tested were aged for 2 weeks in the air at ambient conditions. A 5 g piece of the tablet was broken off of the tablet. Approximately 195 g water was added to a 1 liter glass beaker, and the tablet piece was dropped into the water. The time for the tablet piece to dissolve to the maximal amount without agitation in the beaker was recorded. The pH was measured using a pH test strip after dissolution was completed. Effervescence (foaming height) and the residuals remaining in the water were visually rated.

Preparatory Example

Preparatory Example 1 (PEx1): Preparation of Sodium Carbonate Based Powder Formula 2.7 g of sodium persulfate, 23.6 g of sodium bisulfate, 26.1 g of sodium carbonate, 42.1 g of citric acid, 1.3 g of SIPERNAT 50S and 0.007 g of Duasyn Ink Blue SLK were added to a glass vial followed by tumbling by hand. 2.5 g of LATHANOL LAL, 1.5 g of STEPANOL WA-100 NF/USP and 0.30 g of SZ 41894 Citrus were added to a separate glass vial followed by tumbling with hand and then were further mixed with a spatula until a uniform mixture was obtained. The two separate mixtures were combined followed by tumbling by hand and mixing with a spatula. The resulting powder mixture was free flowing.

TABLE 1

| PEx1 Formulation | |
|---|---|
| Ingredient | Weight % |
| $Na_2S_2O_8$ | 2.7 |
| $NaHSO_4$ | 23.6 |
| $Na_2CO_3$ | 26.1 |
| Citric Acid | 42.1 |
| SIPERNAT 50S | 1.3 |
| LATHANOL LAL | 2.5 |
| STEPANOL WA-100 NF/USP | 1.5 |
| SZ 41894 Citrus | 0.30 |
| Duasyn Ink Blue SLK | 0.007 |
| Total | 100.0 |

EXAMPLES

Example 1 (Ex1T Tablet)

40.0 g of the Preparatory PEx1 mixture was added to a glass jar followed by adding 5.0 g of DURABOND 45. The resulting mixture was tumbled by hand before adding 1.0 g of DI water. A spatula was then used to stir the mixture until it turned into a uniform solid mixture. 15.0 g of the mixture was added into the cylindrical cavity of the Teflon mold of a tablet press (Hydraulic Unit Model #3912, Carver Inc. Wabash, IN). The diameter of the cavity was 4.0 cm and the fill height of the cavity was 5.0 cm. The weight applied to the plunger was 2500 lbs, resulting in an applied pressure of 1284 psi. The mixture was allowed to dwell in the mold at 1284 psi for 1 minute before the pressure was released. The tablet (Ex1T) was taken out of the cavity and inspected. The tablet was observed to have good initial strength and integrity. After inspection, the fresh tablet was stored in the air at ambient conditions, followed by a second inspection after 24 hours. The tablet was again observed to have good strength and integrity. The aged tablet in dry state was held by hand and rubbed against a hard surface to evaluate its integrity for use as a handheld tool. The tablet held up well under a force that would typically be used for effective cleaning. The aged tablet was immersed in water to reach the wet state, pressed against a hard surface, then moved back and forth with a path length of about 20 cm held by hand. The wet tablet showed good hardness, mechanical integrity and durability. It effervesced and foamed when rubbed against the hard surface with force applied by hand.

TABLE 2

| Ex1T Tablet Formulation | | |
|---|---|---|
| Ingredient | Weight (g) | % in Total Solids |
| PEx1 | 40.0 | 88.9 |
| DURABOND 45 | 5.0 | 11.1 |
| DI water | 1.0 | 0 |
| Total Solids | 45.0 | 0 |
| Total Weight | 46 | 0 |

Example 2 (Ex2T Tablet)

40.0 g of the Preparatory PEx1 mixture was added to a glass jar followed by adding 5.0 g of DURABOND 45. The resulting mixture was tumbled by hand before adding 2.0 g of DI water. A spatula was then used to stir the mixture until it turned into a uniform solid mixture. 15.0 g of the mixture was added into the cylindrical mold of the tablet press and tablets were prepared under the same conditions as described for ExT1 above. The tablet (Ex2T) was taken out of the cavity and inspected. The tablet was observed to have good initial strength and integrity. After inspection, the fresh tablet was stored in the air at ambient conditions, followed by a second inspection after 24 hours. The tablet was again observed to have good strength and integrity. The aged tablet was held by hand and rubbed against a hard surface to evaluate its integrity for use as a handheld tool. The tablet held up well under a force that would typically be used for effective cleaning. The aged tablet was immersed in water to reach the wet state, pressed against a hard surface, then moved back and forth with a path length of about 20 cm held by hand. The wet tablet showed good hardness, mechanical integrity, and durability. It effervesced and foamed when rubbed against the hard surface with force applied by hand.

TABLE 3

| Ex2T Tablet Formulation | | |
|---|---|---|
| Ingredient | Weight (g) | % in Total Solids |
| PEx1 | 40.0 | 88.9 |
| DURABOND 45 | 5.0 | 11.1 |
| DI water | 2.0 | 0 |
| Total Solids | 45.0 | 0 |
| Total Weight | 47.0 | 0 |

Example 3 (Ex3T Tablet)

40.0 g of the Preparatory PEx1 mixture was added to a glass jar followed by adding 5.0 g of DURABOND 45. The resulting mixture was tumbled by hand before adding 2.6 g of DI water. A spatula was then used to stir the mixture until it turned into a uniform solid mixture. 15.0 g of the mixture was added into the cylindrical mold of the tablet press and tablets were prepared under the same conditions as described for ExT1 above. The tablet (Ex3T) was taken out of the cavity and inspected. The tablet was observed to have good initial strength and integrity. After inspection, the fresh tablet was stored in the air at ambient conditions, followed by a second inspection after 24 hours. The tablet was again observed to have good strength and integrity. The aged tablet was held by hand and rubbed against a hard surface to evaluate its integrity for use as a handheld tool. The tablet held up well under a force that would typically be used for effective cleaning. The aged tablet was immersed in water to reach the wet state, pressed against a hard surface, then moved back and forth with a path length of about 20 cm held by hand. The wet tablet showed good hardness, mechanical integrity and durability. It effervesced and foamed when rubbed against the hard surface with force applied by hand.

TABLE 4

| Ex3T Tablet Formulation | | |
|---|---|---|
| Ingredient | Weight (g) | % in Total Solids |
| PEx1 | 40.0 | 88.9 |
| DURABOND 45 | 5.0 | 11.1 |
| DI water | 2.6 | 0 |
| Total Solids | 45.0 | 0 |
| Total Weight | 47.6 | 0 |

Example 4 (Ex4T Tablet)

40.0 g of the Preparatory PEx1 mixture was added to a glass jar followed by adding 5.0 g of DURABOND 45 and 1.0 g of POLYOX WSR 205. The resulting mixture was tumbled by hand before adding 2.0 g of DI water. A spatula was then used to stir the mixture until it turned into a uniform solid mixture. 15.0 g of the mixture was added into the cylindrical mold of the tablet press and tablets were prepared under the same conditions as described for ExT1 above. The tablet (Ex4T) was taken out of the cavity and inspected. The tablet was observed to have good initial strength and integrity. After inspection, the fresh tablet was stored in the air at ambient conditions, followed by a second inspection after 24 hours. The tablet was again observed to have good strength and integrity. The aged tablet was held by hand and rubbed against a hard surface to evaluate its integrity for use as a handheld tool. The tablet held up well under a force that would typically be used for effective cleaning.

TABLE 5

| Ex4T Tablet Formulation | | |
|---|---|---|
| Ingredient | Weight (g) | % in Total Solids |
| PEx1 | 40.0 | 87.0 |
| DURABOND 45 | 5.0 | 10.9 |
| POLYOX WSR 205 | 1.0 | 2.2 |
| DI water | 2.0 | 0 |
| Total Solids | 46.0 | 0 |
| Total Weight | 47.0 | 0 |

Example 5 (Ex5T Tablet)

40.0 g in the Preparatory PEx1 mixture was added to a glass jar followed by adding 5.0 g of DURABOND 45 and 1.0 g of poly(acrylic acid) (Mv~1,250,000). The resulting mixture was tumbled by hand before adding 2.0 g of DI water. A spatula was then used to stir the mixture until it turned into a uniform solid mixture. 15.0 g of the mixture was added into the cylindrical mold of the tablet press and tablets were prepared under the same conditions as described for ExT1 above. The tablet (Ex5T) was taken out of the cavity and inspected. The tablet was observed to have good initial strength and integrity. After inspection, the fresh tablet was stored in the air at ambient conditions, followed by a second inspection after 24 hours. The tablet was again observed to have good strength and integrity. The aged tablet was held by hand and rubbed against a hard surface to evaluate its integrity for use as a handheld tool. The tablet held up well under a force that would typically be used for effective cleaning.

TABLE 6

| Ex5T Tablet Formulation | | |
|---|---|---|
| Ingredient | Weight (g) | % in Total Solids |
| PEx1 | 40.0 | 87.0 |
| DURABOND 45 | 5.0 | 10.9 |
| Poly(acrylic acid) | 1.0 | 2.2 |
| DI water | 2.0 | 0 |
| Total Solids | 46.0 | 0 |
| Total Weight | 47.0 | 0 |

Example 6 (Ex6T Tablet)

40 g of in the Preparatory PEx1 mixture was added to a glass jar followed by adding 5.0 g of DURABOND 45. The resulting mixture was tumbled by hand before adding 3.65 g of SOKALAN CP10. A spatula was then used to stir the mixture until it turned into a uniform solid mixture. 15.0 g of the mixture was added into the cylindrical mold of the tablet press and tablets were prepared under the same conditions as described for ExT1 above. The tablet (Ex6T) was taken out of cavity and inspected. The tablet was observed to have good initial strength and integrity. After inspection, the fresh tablet was stored in the air at ambient conditions, followed by a second inspection after 24 hours. The tablet was again observed to have good strength and integrity. The aged tablet was held by hand and rubbed against a hard surface by hand to evaluate its integrity for use as a handheld tool. The tablet held up well under a force that would typically be used for effective cleaning. The aged tablet was immersed in water to reach the wet state, pressed against a hard surface, then moved back and forth with a path length of about 20 cm held by hand. The wet tablet showed good hardness, mechanical integrity and durability. It effervesced and foamed when rubbed against the hard surface with force applied by hand.

TABLE 7

| Ex6T Tablet Formulation | | |
|---|---|---|
| Ingredient | Weight (g) | % in Total Solids |
| PEx1 | 40.0 | 85.8 |
| DURABOND 45 | 5.0 | 10.7 |
| SOKALAN CP10 | 3.65 | 3.5 |
| Total Solids | 46.6 | 0 |
| Total Weight | 48.7 | 0 |

Example 7 (Ex7T Tablet)

40 g of the Preparatory PEx1 mixture was added to a glass jar followed by adding 5.0 g of DURABOND 45. The resulting mixture was tumbled by hand before adding 4.0 g of SOKALAN CP10S. A spatula was then used to stir the mixture until it turned into a uniform solid mixture. 15.0 g of the mixture was added into the cylindrical mold of the tablet press and tablets were prepared under the same conditions as described for ExT1 above. The tablet (Ex7T) was taken out of cavity and inspected. The tablet was observed to have good initial strength and integrity. After inspection, the fresh tablet was stored in the air at ambient conditions, followed by a second inspection after 24 hours. The tablet was again observed to have good strength and integrity. The aged tablet was held by hand and rubbed against a hard surface to evaluate its integrity for use as a handheld tool. The tablet held up well under a force that would typically be used for effective cleaning.

TABLE 8

Ex7T Tablet Formulation

| Ingredient | Weight (g) | % in Total Solids |
|---|---|---|
| PEx1 | 40.0 | 85.1 |
| DURABOND 45 | 5.0 | 10.6 |
| SOKALAN CP10S | 4.0 | 4.3 |
| Total Solids | 47.0 | 0 |
| Total Weight | 49.0 | 0 |

Shore A and Shore D Hardness measurements were carried out for Example ExT4-ExT7 tablets after aging for one day, according to the Tablet Hardness test method described above. Results are summarized in Table 9.

TABLE 9

Tablet Hardness

| Tablet | Shore Hardness Type A | Shore Hardness Type D |
|---|---|---|
| Ex4T | 92 | 29 |
| Ex5T | 92 | 28 |
| Ex6T | 92 | 29 |
| Ex7T | 91 | 35 |

Examples 8-15 (Ex8T-Ex15T Tablets)

Compositions containing varied amounts of calcium sulfate hemihydrate and SOKALAN CP10 were prepared according to the formulations shown in Table 10. For each Example formulation, LATHANOL LAL and STEPANOL WA-100 NF/USP were first mixed together, then SIPERNAT 50S was added into the mixture. This was followed by the sequential addition of citric acid, sodium bisulfate, sodium carbonate, calcium sulfate hemihydrate and pumice to the mixture. After adding each ingredient, the resulting mixture was mixed for about 30-60 seconds, either manually or with a spatula or with a mechanical blender. Finally, SOKALAN CP10 was added into the powder mixture and the final mixture was further mixed until it was uniform and free-flowing.

To prepare tablets of each composition, 30.0 g of the final mixture was added into the cylindrical mold of the tablet press as described for ExT1 above. The weight applied to the plunger was 2500 lbs, resulting in an applied pressure of 1284 psi. The mixture was allowed to dwell in the mold at 1284 psi for 1 minute before the pressure was released. The tablet was taken out of cavity and inspected. The Ex8T-Ex15T tablets were observed to have good initial strength and integrity.

TABLE 10

Ex8T-Ex15T Tablet Formulations

| Ingredient (wt, g) | Ex8T | Ex9T | Ex10T | Ex11T | Ex12T | Ex13T | Ex14T | Ex15T |
|---|---|---|---|---|---|---|---|---|
| $Na_2CO_3$ | 25.3 | 24.2 | 23.1 | 22 | 23.1 | 22.6 | 22 | 21.5 |
| Citric Acid | 40.9 | 39.1 | 37.4 | 35.6 | 37.3 | 36.4 | 35.6 | 34.7 |
| $NaHSO_4$ | 22.8 | 21.9 | 20.9 | 19.9 | 20.9 | 20.4 | 19.9 | 19.4 |
| LATHANOL LAL | 2.4 | 2.3 | 2.2 | 2.1 | 2.2 | 2.2 | 2.1 | 2.1 |
| STEPANOL WA-100 NF/USP | 1.4 | 1.4 | 1.3 | 1.2 | 1.3 | 1.3 | 1.2 | 1.2 |
| SIPERNAT 50S | 1.2 | 1.1 | 1.1 | 1.1 | 1.1 | 1.0 | 1.1 | 1.0 |
| Calcium sulfate hemihydrate | 2.5 | 5.0 | 7.5 | 10.1 | 10.1 | 10.1 | 10.1 | 10.1 |
| SOKALAN CP10 | 1.5 | 3.0 | 4.5 | 6.0 | 2.0 | 4.0 | 6.0 | 8.0 |
| Pumice | 2.0 | 2.0 | 2.0 | 2.0 | 2.0 | 2.0 | 2.0 | 2.0 |
| TOTAL (g) | 100 | 100 | 100 | 100 | 100 | 100 | 100 | 100 |

Shore D Hardness measurements were carried out for Examples ExT8-ExT15 tablets after 24 hour aging, according to the Tablet Hardness test method described above. Results are summarized in Table 11.

TABLE 11

Initial Hardness and Hardness after Aging for 1 Day for Ex8T-Ex15T Tablets

| Shore D Hardness | Ex8T | Ex9T | Ex10T | Ex11T | Ex12T | Ex13T | Ex14T | Ex15T |
|---|---|---|---|---|---|---|---|---|
| Initial (Day 0) | 13 | 20 | 21 | 18 | 16 | 26 | 18 | 4 |
| Day 1 | 25 | 28 | 33 | 32 | 27 | 32 | 28 | 16 |

Additional Shore D Hardness measurements were carried out for Example Ex12T-Ex15T tablets according to the Tablet Hardness test method described above to include additional aging after 4 days, 7 days and 14 days. Results are summarized in Table 12. Each value is the average of four data points for one tablet.

TABLE 12

Hardness after Additional Aging for Ex12T-Ex15T Tablets

| Shore D Hardness | Ex12T | Ex13T | Ex14T | Ex15T |
|---|---|---|---|---|
| Initial (Day 0) | 16 | 25 | 18 | 4 |
| Day 1 | 21 | 31 | 26 | 13 |
| Day 4 | 22 | 32 | 38 | 38 |

TABLE 12-continued

Hardness after Additional Aging for Ex12T-Ex15T Tablets

| Shore D Hardness | Ex12T | Ex13T | Ex14T | Ex15T |
|---|---|---|---|---|
| Day 7 | 17 | 28 | 43 | 37 |
| Day 14 | 16 | 38 | 39 | 41 |

Examples 16-23 (Ex16T-23T Tablets)

Example 16-23 compositions were prepared according to the formulations shown in Table 13, and tablets were formed for each composition using the procedures described above for Examples Ex8-15. The Ex16T-Ex23T tablets were observed to have good initial strength and integrity.

TABLE 13

Ex16T-Ex23T Tablet Formulations

| Ingredient (wt, g) | Ex16T | Ex17T | Ex18T | Ex19T | Ex20T | Ex21T | Ex22T | Ex23T |
|---|---|---|---|---|---|---|---|---|
| $Na_2CO_3$ | 23.1 | 23.1 | 23.1 | 23.1 | 23.1 | 23.1 | 23.1 | 23.1 |
| Citric Acid | 37.4 | 37.4 | 37.4 | 37.4 | 37.4 | 37.4 | 37.4 | 37.4 |
| $NaHSO_4$ | 20.9 | 20.9 | 20.9 | 20.9 | 20.9 | 20.9 | 20.9 | 20.9 |
| LATHANOL LAL | 2.2 | 2.2 | 2.2 | 2.2 | 2.2 | 2.2 | 2.2 | 2.2 |
| STEPANOL WA-100 NF/USP | 1.3 | 1.3 | 1.3 | 1.3 | 1.3 | 1.3 | 1.3 | 1.3 |
| SIPERNAT 50S | 1.1 | 1.1 | 1.1 | 1.1 | 1.1 | 1.1 | 1.1 | 1.1 |
| Calcium sulfate hemihydrate | 7.0 | 7.0 | 7.0 | 7.0 | 5.0 | 5.0 | 5.0 | 5.0 |
| SOKALAN CP10 | 1.5 | 3.0 | 4.5 | 6.0 | 1.5 | 3.0 | 4.4 | 6.0 |
| Pumice | 5.5 | 4.0 | 2.5 | 1.0 | 7.5 | 6.0 | 4.5 | 3.0 |
| TOTAL (g) | 100 | 100 | 100 | 100 | 100 | 100 | 99.9 | 100 |

Shore D Hardness measurements were carried out for Example ExT16-ExT23 tablets after 24 hour aging, according to the Tablet Hardness test method described above. Results are summarized in Table 14. N/A means that the hardness value was not measured.

TABLE 14

Initial Hardness and Hardness after Aging for 1 Day for Ex16T-Ex23T Tablets

| Hardness (Durometer D) | Ex16T | Ex17T | Ex18T | Ex19T | Ex20T | Ex21T | Ex22T | Ex23T |
|---|---|---|---|---|---|---|---|---|
| Initial (Day 0) | 5 | 18 | 21 | 16 | 11 | 18 | 17 | 17 |
| Day 1 | | 20 | 28 | 32 | N/A | 26 | 27 | 28 |

Additional properties of several of the Example tablets were studied as described in the above Tablet Properties test methods. Results are summarized in Table 15.

TABLE 15

| Tablet Properties | | | | |
|---|---|---|---|---|
| | Ex4T | Ex7T | Ex9T | Ex10T |
| Sample weight (g) | 5.16 | 5.2 | 5.11 | 5.11 |
| Water (g) | 195.49 | 195.24 | 195.57 | 195.59 |
| Dissolution time (min) | 15.5 | 16 | 15.3 | 15 |
| pH (final Solution) | 4.53 | 4.23 | 4.09 | 4.36 |
| Effervescence | some (¼") | some (¼") | some (¼") | some (¼") |
| Residuals | some | some | some | some |

Comparative Examples

Comparative Example CEx1 (CEx1T)

40 g of the Preparatory PEx1 mixture was added to a glass jar followed by adding 5.0 g of calcium carbonate. The resulting mixture was tumbled by hand before adding 2.0 g of DI water. A spatula was then used to stir the mixture until it turned into a uniform solid mixture. 15.0 g of the mixture was added into the cylindrical mold of the tablet press and tablets were prepared under the same conditions as described for ExT1 above. The tablet (CEx1T) was taken out of the cavity and inspected. The tablet was broken by gentle force applied by hand. After inspection, the broken tablet was stored in the air at ambient conditions, followed by a second inspection after 24 hours. The tablet was broken again by gentle force applied by hand.

TABLE 16

| CEx1T Tablet Formulation | | |
|---|---|---|
| Ingredient | Weight (g) | % in Total Solids |
| PEx1 | 40.0 | 88.9 |
| Calcium carbonate | 5.0 | 11.1 |
| Water | 2.0 | 0 |

Comparative Example CEx2 (CEx2T)

40 g of the Preparatory PEx1 mixture was added to a glass jar followed by adding 5.0 g of calcium sulfate dihydrate. The resulting mixture was tumbled by hand before adding 2.0 g of DI water. A spatula was then used to stir the mixture until it turned into a uniform solid mixture. 15.0 g of the mixture was added into the cylindrical mold of the tablet press and tablets were prepared under the same conditions as described for ExT1 above. The tablet (CEx2T) was taken out of the cavity and inspected. The tablet was broken by gentle force applied by hand. After inspection, the broken tablet was stored in the air at ambient conditions at room temperature in a fume hood, followed by a second inspection after 24 hours. The tablet was broken again by gentle force applied by hand.

TABLE 17

| CEx2T Tablet Formulation | | |
|---|---|---|
| Ingredient | Weight (g) | % in Total Solids |
| PEx1 | 40.0 | 88.9 |
| Calcium sulfate dihydrate | 5.0 | 11.1 |
| Water | 2.0 | 0 |

Comparative Example 3T (CEx3T)

40 g of the Preparatory PEx1 mixture was added to a glass jar followed adding 2.0 g of DI water. A spatula was then used to stir the mixture until it turned into a uniform solid mixture. 15.0 g of the mixture was added into the cylindrical mold of the tablet press and tablets were prepared under the same conditions as described for ExT1 above. The tablet (CEx3T) was taken out of cavity and inspected. Initial strength was low and the tablet was partially broken while being taken out of the mold. After inspection, the fresh tablet was stored the air at ambient conditions, followed by a second inspection after 24 hours. The tablet strength improved after aging. The aged tablet was rubbed against a hard surface held by hand to evaluate the integrity as a handheld tool and broke during the rubbing test.

TABLE 18

| CEx3T Tablet Formulation | | |
|---|---|---|
| Ingredient | Weight (g) | % in Total Solids |
| PEx1 | 40.0 | 100.0 |
| DI Water | 2.00 | 0 |
| Total Solids | 40.0 | 0 |
| Total Weight | 42.0 | 0 |

Although the present invention has been described with reference to preferred embodiments, workers skilled in the art will recognize that changes may be made in form and detail without departing from the spirit and scope of the invention.

What is claimed is:

1. A cleaning article comprising:

calcium sulfate hemihydrate as an inorganic binder;

a gas generator;

an acid; and at least about 0.1% water, wherein the cleaning article has an aged Shore A hardness of at least about 10, an aged Shore D hardness of up to about 100, and a dissolution time of between about 1 minute and about 60 minutes.

2. The cleaning article of claim 1, further comprising one of a chelating agent, a surfactant, a hydrophilic agent, a lubricant, a mold release agent, an oxidizer, a fragrance, and an anti-caking agent.

3. The cleaning article of claim 2, wherein when the cleaning article comprises an anti-caking agent, the anti-caking agent is hydrophobic.

4. The cleaning article of claim 1, wherein the inorganic binder reacts with the water.

5. The cleaning article of claim 1, wherein the cleaning article has an aged Shore A hardness of at least about 30.

6. The cleaning article of claim 1, wherein the cleaning article has an aged Shore A hardness of at least about 50.

7. The cleaning article of claim 1, wherein the cleaning article has a dissolution time of between about 5 minutes and about 40 minutes.

8. The cleaning article of claim 1, wherein the cleaning article has a dissolution time of between about 10 minutes and about 30 minutes.

9. The cleaning article of claim 1, wherein the cleaning article has a pH of between 0 and about 6 when dissolved in water.

10. The cleaning article of claim 1, wherein the cleaning article has a cleaning efficiency when used without mechanical force.

11. A solid cleaning composition comprising:

calcium sulfate hemihydrate as an inorganic binder that reacts with water to harden to form a hardened structure;

a gas generator;

an acid; and a water-containing liquid.

12. The solid cleaning composition of claim 11, wherein the solid cleaning composition has an aged Shore A hardness of at least about 10.

13. The solid cleaning composition of claim 11, wherein the solid cleaning composition has an aged Shore D hardness of up to about 100.

14. The solid cleaning composition of claim 13, wherein the solid cleaning composition has a dissolution time of between about 1 minutes and about 60 minutes.

15. The solid cleaning composition of claim 11, wherein the solid cleaning composition has a pH of between about 0 and about 6 when dissolved in water.

16. The solid cleaning composition of claim 11, wherein the solid cleaning composition has a cleaning efficiency when used with or without mechanical force.

17. The solid cleaning composition of claim 11, further comprising one of a chelating agent, a surfactant, a hydrophilic agent, a lubricant, a mold release agent, an oxidizer, a fragrance, and an anti-caking agent.

* * * * *